(No Model.) 2 Sheets—Sheet 1.
W. W. DUNN.
WATER WHEEL.
No. 317,934. Patented May 12, 1885.
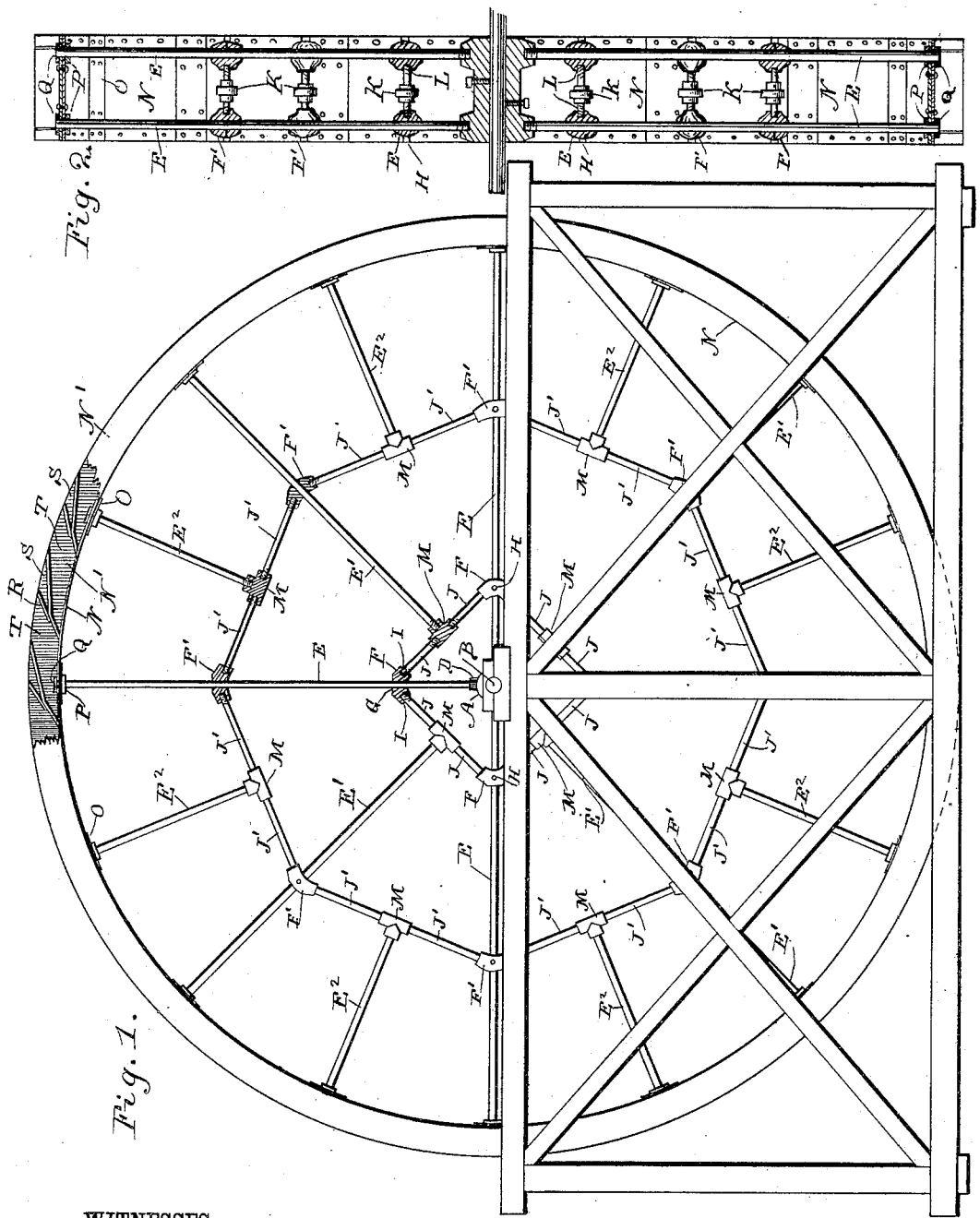
WITNESSES:
Thos Houghton.
A. G. Syne
INVENTOR:
W. W. Dunn
BY 
ATTORNEYS.

(No Model.) 2 Sheets—Sheet 2.

W. W. DUNN.
WATER WHEEL.

No. 317,934. Patented May 12, 1885.

WITNESSES:
Thos. Houghton.
A. L. Syne.

INVENTOR:
W. W. Dunn
BY Munn & Co.
ATTORNEYS.

UNITED STATES PATENT OFFICE.

WILLIAM WASHINGTON DUNN, OF FORT WORTH, TEXAS.

WATER-WHEEL.

SPECIFICATION forming part of Letters Patent No. 317,934, dated May 12, 1885.

Application filed July 8, 1884. (No model.)

*To all whom it may concern:*

Be it known that I, WILLIAM W. DUNN, of Fort Worth, in the county of Tarrant and State of Texas, have invented a new and useful Improvement in Water-Wheels, of which the following is a full, clear, and exact description, reference being had to the annexed drawings, forming part of this specification.

The object of this invention is to provide an iron water-wheel made in sections, which may be readily taken apart for convenience in transportation.

Figure 3:
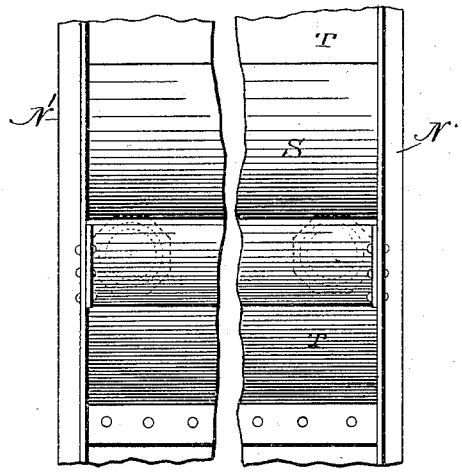
Figure 4:
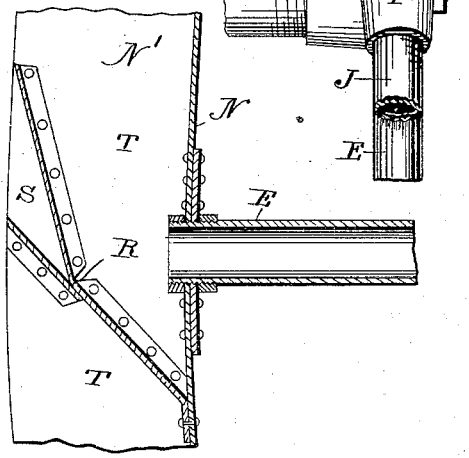
Figure 5:
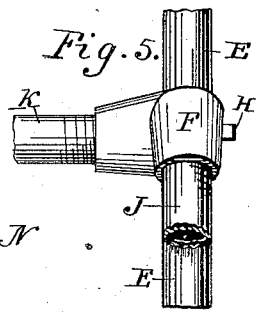
Figure 6:
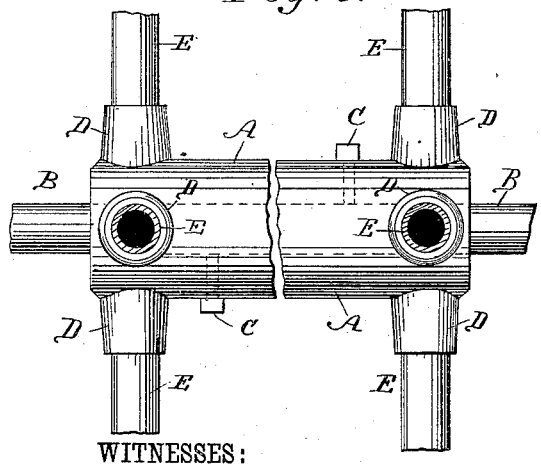
Figure 7:
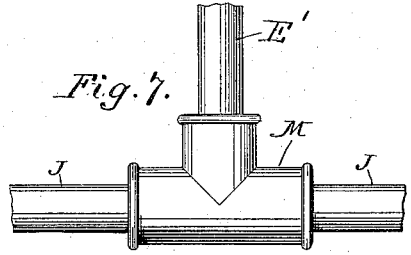
Figure 8:
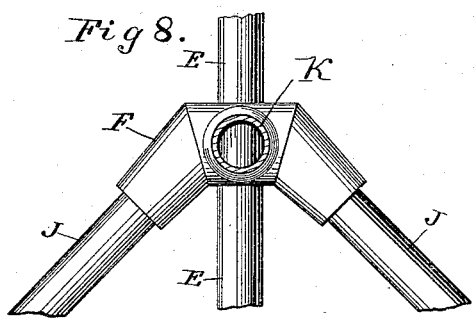

In the drawings, Figure 1 is a side elevation of the wheel and supporting-frame, the wheel being partly in section. Fig. 2 is a cross-section of the wheel; and Figs. 3, 4, 5, 6, 7, and 8 are detail views.

A indicates the hub of the wheel, and B the shaft, to which the hub is secured by set-screws C. The hub is provided at each end with four tubular internally-threaded projections, D, and into each projection D is screwed a spoke, E, made of gas-pipe, which extends to the rim of the wheel. Each spoke E is provided at a short distance from the hub with a cast rectangular elbow, F, having a central transverse aperture, G, for said spoke, being secured to the spoke by a set-screw, H, and with internally-threaded sockets I at the ends, into which are screwed the eight short pipes or arms J, forming a square around the hub. The four spokes E at each side of the wheel are thus connected together, and the elbow-connections F of one side of the wheel are connected to the elbow-connections F of the other side by right and left hand threaded connections K, screwing into suitable recesses, L, formed in the inner sides of the connections F.

Each pair of arms J is secured together by a T-shaped connection, M, into which is screwed a supplemental spoke, E², extending from said connection to the rim of the wheel. Four supplemental spokes are thus added to each side of the wheel.

About midway between the square formed by the arms J and the rim of the wheel the spokes E E' are provided with elbow-connections F', like the connections F in all respects, except that their ends are inclined at an obtuse angle, instead of a right angle, with each other. Into the elbow-connections F' are screwed arms J', forming an octagonal figure around the aforesaid square. The connections F' of one side of the wheel are connected to those of the other side by connections K, like those above described.

Each pair of arms J' is secured together by a T-shaped connection, M, like those above described, and into each said connection M is screwed a supplemental spoke, E², extending from said connection to the rim of the wheel. Eight supplemental spokes, E², are thus added to each side of the wheel, making sixteen spokes to each side of the wheel, or thirty-two spokes in all. The number of spokes will vary according to size of wheel.

The rim N of the wheel is formed with two parallel flanges, N', and the ends of the spokes are passed through said rim and the cross-plates O, and are secured thereto by inside and outside nuts, P Q.

R indicates the buckets, having double cavities S T.

For an undershot wheel simply radial partitions between the flanges N' may be used for buckets or paddles.

What I claim is—

A sectional iron wheel formed of the following detachable parts, viz: a cast hub, main spokes formed of gas-pipe and screwed into said hub, cast elbow-connections secured to said spokes, arms screwed into said connections to connect the main spokes together, T-connections secured to said arms, supplemental spokes screwed into said T-connections, elbow-connections and arms screwed into the same for connecting said main and supplemental spokes, T-connections secured to said latter arms, and a second series of supplemental spokes screwed into said latter T-connections, and a rim bolted to the outer ends of said main and supplemental spokes, substantially as shown and described.

WILLIAM WASHINGTON DUNN.

Witnesses:
ROBERT HANDEL,
BASCOM DUNN.